Nov. 6, 1934.  F. W. BIRKENHAUER  1,979,664

MULTIPLE PIE BAKING PAN

Filed May 12, 1933

INVENTOR
Frederick W. Birkenhauer,
BY
Harry R. Rook,
ATTORNEY

Patented Nov. 6, 1934

1,979,664

UNITED STATES PATENT OFFICE 1,979,664

MULTIPLE PIE BAKING PAN

Frederick W. Birkenhauer, Newark, N. J., assignor to Pie Bakeries, Inc., Newark, N. J., a corporation of Delaware Application May 12, 1933, Serial No. 670,668

4 Claims. (Cl. 53—6)

This invention relates in general to baking pans, particularly pans for baking pies; and the invention especially contemplates a baking pan comprising a plurality of pie receptacles or compartments.

One object of the invention is to provide novel and improved means for securing a plurality of separate pans or receptacles together into a unitary structure whereby a plurality of separate small pies or the like can be handled and baked simultaneously, economically and conveniently.

Another object is to provide such a pan which shall include a novel and improved one-piece frame to receive the plurality of pans, and novel and improved means for securing the pans to said frame, whereby the structure shall be simple and inexpensive, and the frame shall reenforce the pans so that they will effectually withstand the rough usage to which they are subjected.

A further object is to provide a pie baking pan of the general character described wherein each of the separate pans shall have an integral upstanding perimetral flange to be overlaid by the pie crusts, and to cooperate with a presser, such as a roller, whereby the crusts may be severed and trimmed by squeezing the crust between said presser and the edges of said flanges, and said rings reenforce both the frame and the pans against flexing in their own planes under such pressure.

Other objects are to provide a pie baking pan which shall have a recess for a pie bounded by a horizontal marginal flange from which projects an upstanding vertical flange of a height less than the combined thicknesses of the two crusts of a pie, over which flanges the pie crusts are laid as a pie is made, whereby the crusts may be severed and trimmed by squeezing the crusts between the edges of said upstanding flanges and a presser, such as a roller, and the edge portions of the crusts may be pressed together between said presser and said horizontal marginal flange simultaneously with the severing of the crusts; and to obtain other advantages and results as will be brought out by the following description.

Referring to the accompanying drawing in which corresponding and like parts are designated by the same reference characters, Figure 1 is a top plan view of a multiple pie baking pan embodying my invention.

Figure 1:
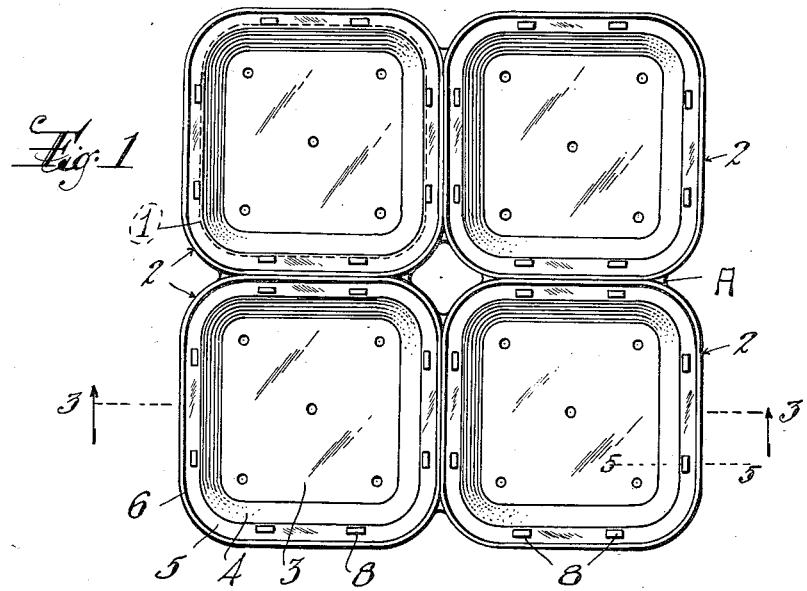
Figure 2:
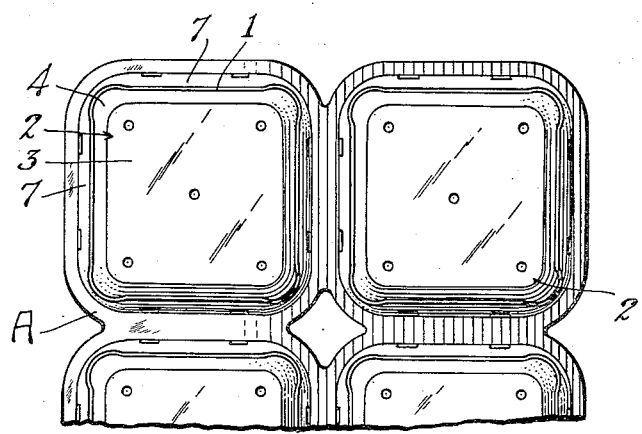
Figure 2 is a fragmentary bottom plan view thereof.

Specifically describing the illustrated embodiment of the invention, my multiple pie baking pan includes a frame A preferably formed of a single piece of sheet material and having a plurality of openings 1, to receive separate pans 2. In the present instance the pans are shown as substantially square in plan view, and accordingly each of the openings 1 is square so as to nicely receive one of the pans.

Each of the pans 2 is shown as having a bottom wall 3, side walls 4, and marginal horizontal or lateral flanges 5 from which project vertical or upstanding perimetral flanges 6.

Figure 3:
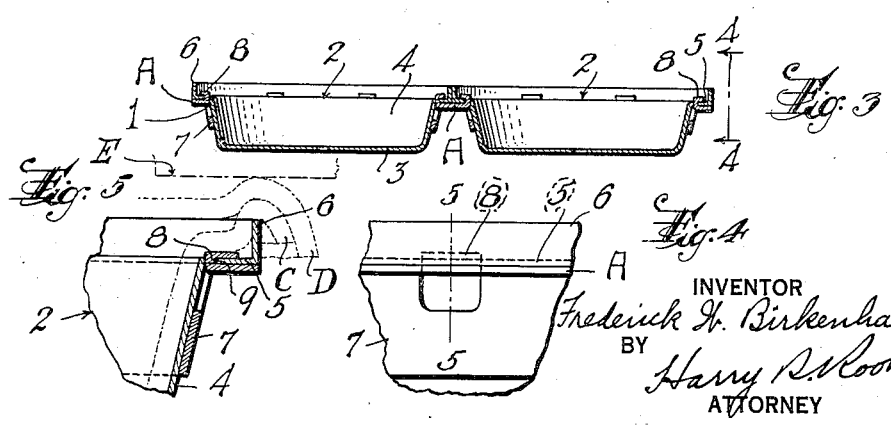
Figure 3 is a transverse vertical sectional view on the line 3—3 of Figure 1.
Figure 5:
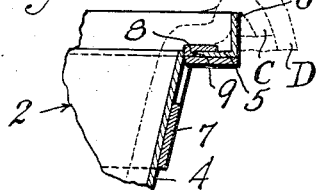
Figure 5 is a transverse sectional view on the line 5—5 of Figure 4.
Figure 4:
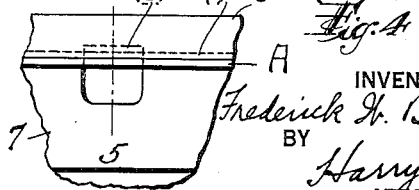
Figure 4 is an enlarged fragmentary side elevation of the pan from the line 4—4 of Figure 3.

The openings 1 in the frame A are arranged so that the pans are located in the same general plane in contacting relation to form an approximately square unit, as clearly shown in Figure 1, and the sides of the openings 1 preferably have integral depending flanges 7 to snugly contact with the side walls 4 of the corresponding pans. The pans are inserted into the openings 1 with the horizontal flanges 5 of the pans in contact with the frame as shown in Figures 3 and 5 of the drawing, and the pans are secured in the frame by tongues 8 which are struck up from the flanges 7 of the frame and are clinched through openings 9 in the horizontal flanges 5 of the pans as clearly shown in the enlarged Figures 4 and 5. The portions of the tongues in said openings are disposed in planes perpendicular to the planes of the flanges and said frame.

With such a construction, a strong and durable multiple pie baking pan is provided whereby a plurality of separate small pies or the like can be handled and baked simultaneously, economically and conveniently. The pans are effectually reenforced by the frame A, and the flanges 7 of the frame both reenforce the sides of the pans and stiffen the frame against bending in its own plane, while the portions of the tongues in the openings and the perimetral flanges 6 similarly reenforce said pans and said frame.

The horizontal flanges 5 and vertical flanges 6 will effectually cooperate with a presser for severing, trimming and sealing the crusts of a pie, for example as shown in Figure 5 of the drawing where the two crusts C and D of a pie are represented by dot and dash lines. In making a pie, a single bottom crust C is placed over all of the pans with its edges overhanging the flanges 6, and a similar single top crust D is laid over the filling of the pie with its edges overlying the flanges 6, as shown by dot and dash lines in Figure 5. These two crusts may be divided into a plurality of separate crusts, one for each pan, and the edges of the crusts may be trimmed, by squeezing the crusts between a presser E, such as a roller, and the edges of the upstanding flanges 6 so as to cause the flanges to cut through the crusts. If the upstanding flanges 6 are made of a height somewhat less than the combined thicknesses of the two crusts, the edge portions of the crusts may be pressed together between such a presser and the horizontal flanges 5 so as to seal the pie to prevent escape of liquid therefrom.

While I have shown my baking pan as of a certain shape and as embodied in certain details of construction it should be understood that this is primarily for illustrating the principles of the invention and that many modifications and changes may be made in the details of construction without departing from the spirit or scope of the invention.

Having thus described my invention, what I claim is:

1. A multiple baking pan comprising a plurality of separate pans having marginal lateral flanges, a one-piece frame having an opening receiving each pan with the marginal flange of the pan abutting the top side of the frame, each pan having a plurality of openings in its marginal flange and said frame having tongues clinched through said openings to secure said pans in said frame, portions of said tongues being in planes perpendicular to the planes of said flanges and said frame.

2. A multiple baking pan comprising a plurality of separate pans having marginal lateral flanges, a one-piece frame having an opening receiving each pan with the marginal flange of the pan abutting the top side of the frame, the frame having integral flanges at the edges of said openings snugly abutting the side walls of said pans, and means for fastening said pans in said frame.

3. A multiple baking pan comprising a plurality of separate pans having marginal horizontal flanges, a one-piece frame having an opening receiving each pan with the marginal flange of the pan abutting the top side of the frame, the frame having integral flanges at the edges of said openings snugly abutting the side walls of said pans and each pan having a plurality of openings in its marginal flange and said frame having ears struck up from its said flanges and clinched through said openings in the pans to secure the pans in said frame.

4. A multiple baking pan comprising a plurality of separate pans having marginal lateral flanges, a one-piece frame having an opening receiving each pan with the marginal flange of the pan abutting the top side of the frame and means for fastening said pans in said frame, each of said pans having a perimetral upstanding flange and the upper edges of all of said flanges being in a common horizontal plane whereby the flanges reenforce the pans and said frame against flexing in their own planes.

FREDERICK W. BIRKENHAUER.